United States Patent
Scorta Paci

Patent Number: 5,816,139
Date of Patent: Oct. 6, 1998

[54] STEAM COOKING DEVICE

[76] Inventor: Gigliola Scorta Paci, Viale Catullo 8, I-10090 Gassino (Torino), Italy

[21] Appl. No.: 728,525

[22] Filed: Oct. 9, 1996

[30] Foreign Application Priority Data

Jul. 26, 1996 [EP] European Pat. Off. ............ 96830416

[51] Int. Cl.$^6$ .................................................. A47J 37/12
[52] U.S. Cl. ........................... 99/413; 99/410; 126/369; 126/373
[58] Field of Search .......................... 99/413, 410, 403; 126/369, 373; 219/401

[56] References Cited

U.S. PATENT DOCUMENTS

| | | | |
|---|---|---|---|
| 559,028 | 4/1896 | Griffith | 126/369 |
| 2,785,277 | 3/1957 | Jepson | 99/410 X |
| 4,640,186 | 2/1987 | Hackelsberger | 126/369 X |
| 5,235,904 | 8/1993 | Ludena | 99/413 |
| 5,584,232 | 12/1996 | Bush | 99/413 X |

FOREIGN PATENT DOCUMENTS

| | | |
|---|---|---|
| 427036 | 7/1911 | France . |
| 1599084 | 7/1970 | France . |
| 120632 | 9/1900 | Germany . |
| 29603325 | 5/1994 | Germany . |
| 609161 | 9/1960 | Italy ........................................ 99/413 |
| 110942 | 7/1925 | Switzerland . |
| 30071 | of 1911 | United Kingdom . |
| 567822 | 3/1945 | United Kingdom . |

*Primary Examiner*—Reginald L. Alexander
*Attorney, Agent, or Firm*—Roylance, Abrams, Berdo & Goodman, L.L.P.

[57] ABSTRACT

A steam cooking device, which can be used for steam cooking bain-marie with descending steam, comprising a pot-like body defining a space for containing food to be cooked is described. The body has a central chimney-like projection with one or more holes at its upper end for the passage of the steam and an obturator for controlling the diffusion of the steam. In use, the device is fitted in the top of a pan containing a certain amount of water and is closed at the top by a lid. The steam produced during the heating of the water is diffused, to an extent which can be regulated by the obturator, through the hole in the chimney-like projection into the space in which the food is disposed, cooking the food.

19 Claims, 2 Drawing Sheets

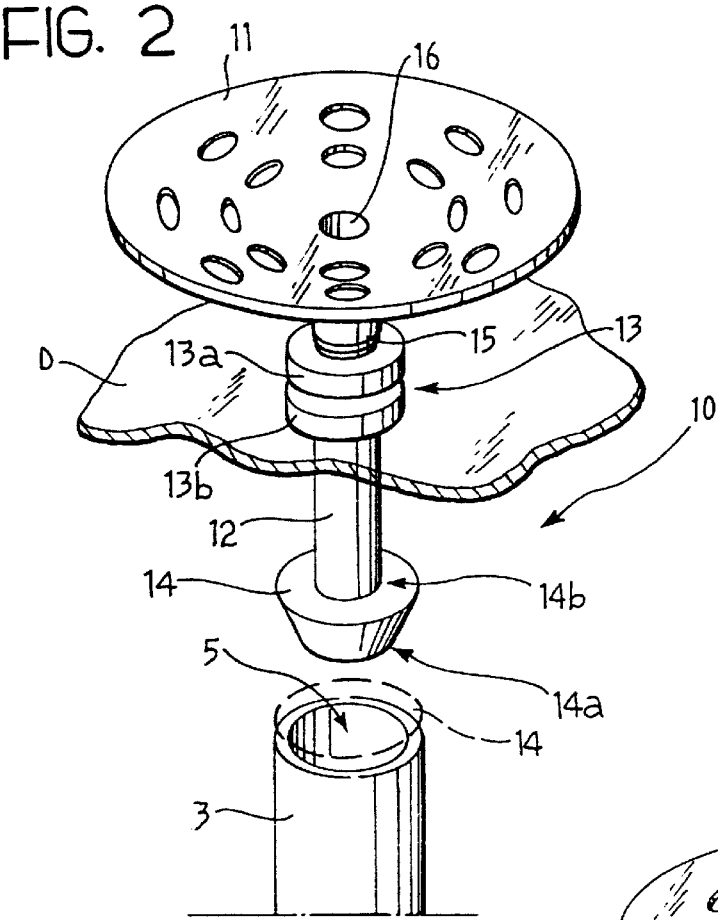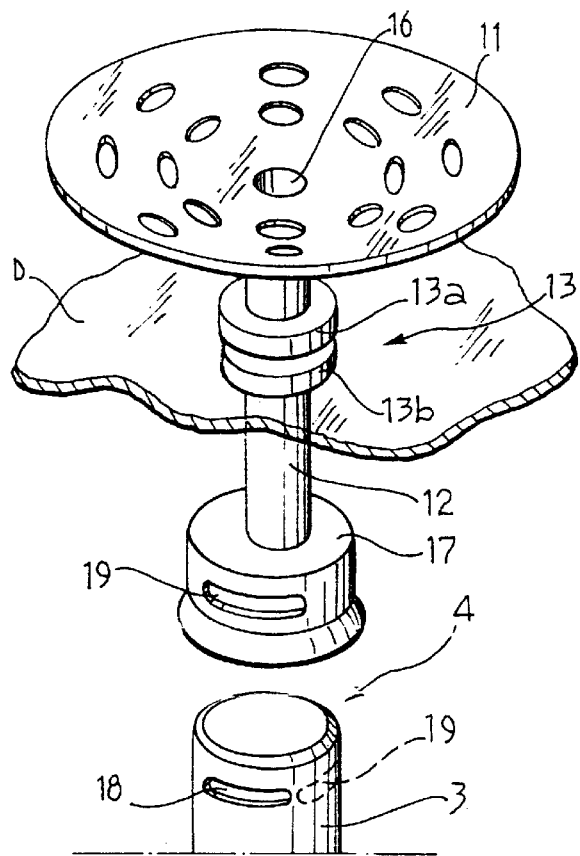

STEAM COOKING DEVICE

BACKGROUND OF INVENTION

The present invention relates to the steam cooking of food and, more specifically, to a device for steam cooking, for example, by the method accurately defined as steam cooking "bain-marie with descending steam".

As is known, the steam cooking of foods has amongst its principal advantages the fact that the use of flavourings (for example, butter, lard and other fats) can be avoided. This cooking technique is particularly suited to reduced fat diets and for this purpose is used with the provision of suitable equipment, for example, in hospitals.

SUMMARY OF INVENTION

The object of the present invention is to provide a device which enables foods to be steam cooked, particularly by the technique "bain-marie with descending steam" and hence without loss of flavour as a result of the cooking and also with precise adjustment of the desired amount of moisture in the food. It is also possible to implement these cooking methods in a domestic environment, if necessary with the use of pans for conventional use.

According to the present invention, this object is achieved by means of a device having the specific characteristics recited in the following claims.

BRIEF DESCRIPTION OF DRAWINGS

The invention will now be described purely by way of non-limiting example with reference to the appended drawings, in which:

FIG. 2 shows the structural details of the part of the device indicated by the arrow II of FIG. 1, and FIG. 3 shows a possible variant of the invention, according to criteria substantially similar to those of FIG. 2.

DETAILED DESCRIPTION OF PREFERRED EMBODIMENTS

Figure 1:
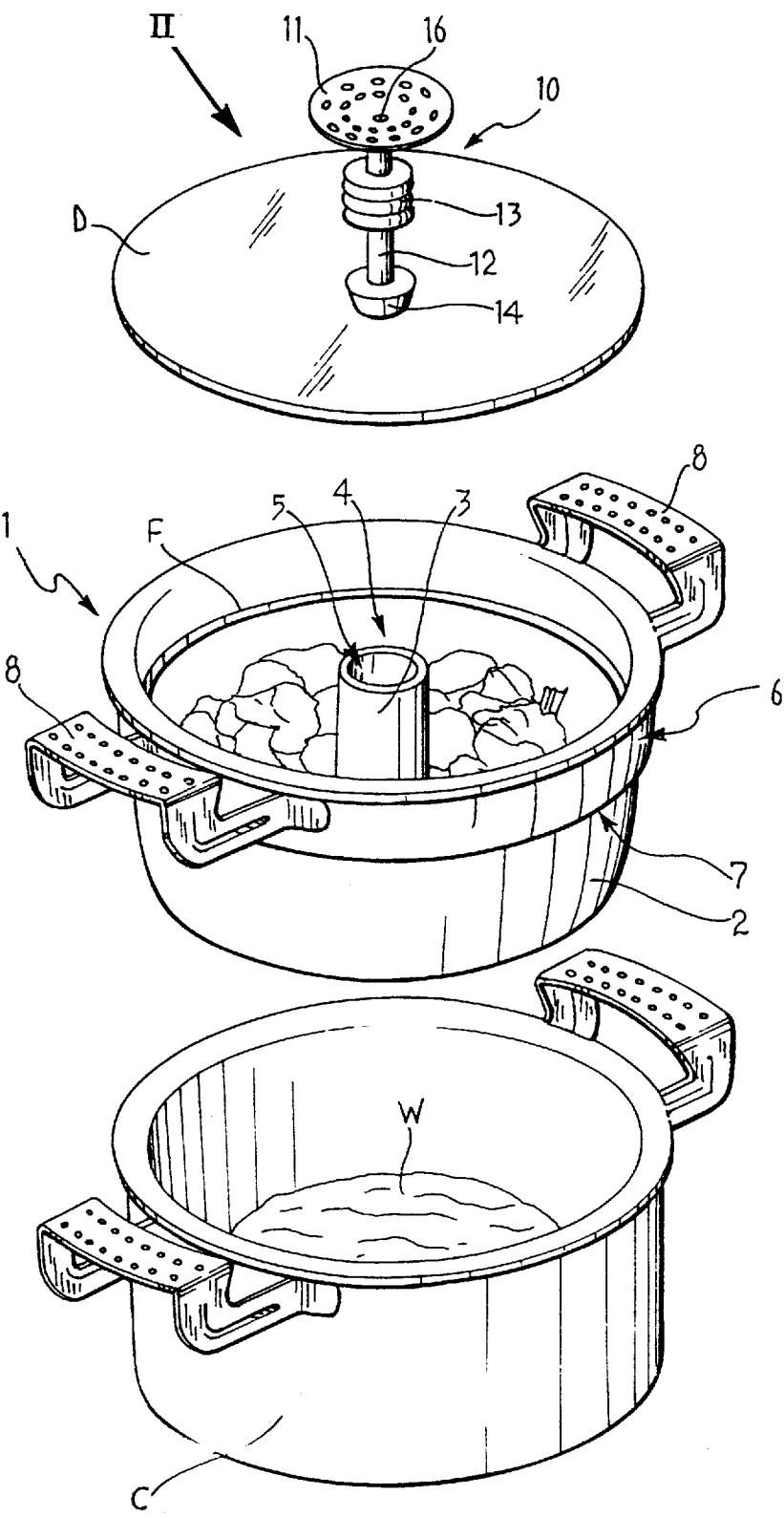
FIG. 1 shows, in a general perspective view, the principle for the use of a device according to the invention for steam cooking food.

In the appended drawings, a device which can be used for cooking food by typical steaming methods bain-marie with descending steam is generally indicated 1.

In the embodiment shown, the device 1 has a generally pot-shaped body 2. The body 2 has a hollow, generally tubular, projection 3, preferably in a generally central position. The projection 3 extends upwards from the base of the pot generally similar to a chimney and thus with its lower aperture opening in the outer (or rear) surface of the pot-like body 2. The top portion 4 of the chimney-like projection 3, which is approximately aligned with the mouth of the pot-like body 2, has a central hole 5 which is intended, in use, to permit the passage and diffusion of steam in the manner which will be described further below.

In the embodiment shown, the body 2 has a structure generally comparable to the structure of certain cake tins or moulds for making generally ring-shaped cakes or puddings, this shape being reproduced precisely, in a complementary manner, by the internal shape of the cake tin or mould.

In the currently-preferred embodiment, the body 2 is made of a metal such as steel.

The use of a metal such as, for example, steel, has been found advantageous both from the production point of view and by virtue of its well-known properties as regards hygiene and the easy of cleaning of the device 1 which, typically, is a kitchen accessory.

Although both the structure described and the selection of material and surface finishing shown by way of example are preferable, they should not be considered absolutely essential. Different structures and, in particular, materials, such as synthetic materials or the like, may in fact be used.

In the currently-preferred embodiment, the outer part of the body 2 has, around the outer periphery of its mouth, an annular band 6 which projects at least slightly from the part below it so as to form a shoulder 7 along its lower edge. Two handles 8, preferably of thermally insulating material or structure (for example, owing to a generally perforate or slotted configuration) extend from the band 6, usually in diametrally opposed positions, enabling the accessory 1 to be held and lifted. The handles 8 are preferably also made of metal such as stainless steel.

FIG. 1 shows how the body 2 can be placed in the open top of a pan C so as to ensure substantial sealing between the edge of the top of the pan C and the outer surface of the body 2 at the shoulder 7 below the band 6. For this reason, the outer or curved surface of the body 2 is preferably generally tapered, typically frustoconically, below the band 6, converging downwardly in the normal position of use so as to provide a certain "lead-in" for the insertion of the body 2 into the top of the pan C which is to act as a steam source.

In use, before the body 2 is inserted in the pan C a certain amount of water W is in fact poured in to produce steam by boiling as a result of the pan C being placed on a heat source.

For this reason, the top of the body 2 is preferably formed in a manner such that its diameter below the band 6, that is, in the portion which is intended to cooperate with the top of the pan C, is approximately the same as the inside diameter of its open top. The lid D usable with the body 2 can thus simply be the lid, or one of the lids, D available for the pan C.

FIG. 2, which shows the same structure as FIG. 1, shows a first solution which permits selective regulation of the flow of steam into the cooking chamber defined by the body 2 and the lid D.

Upon the basis of this solution, the lid D (which may be a metal lid or, preferably, a lid of transparent, heat-resistant material such as glass) has a central handle 10 preferably mounted in a central position on the lid D. For this purpose, the handle 10 is usually produced in the form of an insert which can be inserted and fixed in a corresponding hole in a central position in the lid D.

The handle 10 has an upper gripping element 11 such as, for example a circular knob (preferably perforated and/or coated so as to have athermanous properties), from the lower portion of which a rod 12 extends. The rod 12 extends through a sleeve-like element 13 which can be fitted in the hole in the lid D. The lower end of the rod 12 carries a widened (for example, mushroom-shaped) body 14 the function of which is to act as an obturator which can close the hole 5 in the upper end 4 of the chimney-like projection 3 to a greater or lesser extent.

In the embodiment shown, the obturator 14 is in the form of a generally frustoconical body with a downwardly converging peripheral wall and thus tapered with a taper converging towards the chimney-like projection 3. The obturator 14 thus has a lower base 14a and an upper base 14b, the latter having a profile and diametral dimensions approximately corresponding to the profile and diametral dimensions of the hole 5. This enables the useful cross-section or opening of the hole 5 to be reduced (choked), preferably until the hole 5 is completely closed.

The sleeve 13 is usually composed of two parts, indicated 13a and 13b respectively, which can be connected to one another by an internal screw coupling, not visible in the drawings but of an easily comprehensible structure; one of the two parts 13a, 13b has an axially projecting threaded shank around which the other of the two parts can be fitted and screwed. The sleeve 13 is thus arranged in the central hole in the lid D with the two parts 13a, 13b situated above and below the lid D, respectively.

The portion of the rod 12 which extends through the sleeve-like element 13 has a threaded part 15 which engages a corresponding female thread (not visible in the drawings) formed in the internal wall of the sleeve-like element 13.

The rod 12 can be rotated about its principal central axis (which is vertical in the normal position of use) by means of the knob 11 so as to rotate the threaded portion 15 of the rod 12 in the female thread formed in the element 13. This rotary movement results in a vertical translation of the rod 12 with a consequent movement of the obturator 14, also in a vertical direction. The rod can therefore be moved selectively from an uppermost position (shown in continuous outline in FIG. 2), in which the obturator 14 leaves the hole 5 in the chimney-like projection 3 completely free and a lowermost position (indicated schematically by a broken line in FIG. 2), in which the obturator 14 closes the hole 5 completely.

The two positions mentioned above thus correspond to maximum and minimum (in fact, zero) values of the flow of steam from the hole 5 into the cooking chamber in which the food F is disposed.

By rotating the knob 11, the user can therefore adjust the vertical position of the obturator 14 relative to the hole 5 in the chimney-like projection 3, thus regulating the amount of steam which is made to flow into the cooking chamber, at will, in dependence on the specific requirements of the cooking process and/or his personal practice or tastes.

An axial hole 16 advantageously extends through the rod 12, putting the cavity in the chimney-like projection 3 into limited communication with the exterior (even when the chimney 3 is closed at the top by the obturator 14) enabling the user to be aware of the amount of steam flowing in the projection 3 at the time in question.

Naturally the embodiment illustrated and described with reference to FIG. 2 is only one of many possible solutions which, in practice, enable the flow of steam to the cooking chamber to be regulated.

FIG. 3, in which the same reference numerals have been used to indicate parts identical or functionally equivalent to those already described, illustrates a variant of the solution according to the invention.

In this case, the rod 12 extending from the knob 11 is mounted in the sleeve 13 without a threaded coupling. It can thus be mounted in the sleeve 13 either in a fixed vertical position or, more simply, with the ability to slide freely axially in a vertical direction.

The lower end of the rod 12 carries an obturator 17 constituted by a cup-shaped body which faces downwardly and can be arranged like a bonnet or cap covering the upper end 4 of the chimney-like projection 3 where the latter has one or more elongate circumferential slots 18 corresponding in number and/or position to one or more slots 19 provided in the curved or peripheral surface of the body 17.

In this embodiment, the projection 3 may have a hole 5 at the top as in the solution of FIG. 2, or may be closed as by a lid at its upper end, as shown schematically in FIG. 3; it will be appreciated, however, that any hole 5 present is in any case closed by the base of the cup-shaped body 17.

By acting on the knob 11 so as to rotate the rod 12, the user can rotate the body 17 between a position for the maximum supply of steam which is reached when the slot or slots 19 in the body 17 are aligned precisely with the slot or slots 18 in the upper end 4 of the projection 3, and a position for the minimum (in fact, zero) supply which is reached if the slot or slots 19 are completely out of horizontal alignment with the slot or slots 18 (as shown schematically by broken lines in FIG. 3). Naturally, in this embodiment, the flow of steam can also be regulated precisely by the selection of intermediate angular positions.

As already stated, many variants are possible, the basic principle (the selective regulation of the flow of steam towards the space containing food F) remaining unchanged. For example, it is possible to consider the use of an obturator which can cooperate with the hole 5 in the top of the projection 3 with a stepped coupling approximately comparable to a face coupling with the consequent ability to bring the obturator 4 (also, in this case, by acting on the knob 11) to coupling positions defined by the steps and corresponding to different distances from the edge of the hole 5 and hence to different values of the net cross-section for the outlet of steam from the projection 3. Moreover, the solutions shown in FIGS. 2 and 3 may be merged, for example, with the cup-shaped body 17 supported by the handle 10 with the ability to move axially relative to the projection 3 instead of being mounted for rotation relative to the projection 3. This is to enable the alignment/non-alignment of the slots 18, 19 (which may be oriented axially relative to the projection 3) to be achieved precisely as a result of the axial movement of the element 17.

In the embodiment illustrated, the flow of steam is regulated as a result of the cooperation of the body 2 (particularly of the projection 3) with an element such as the handle 10 associated with the lid D. This is, of course, only one of many possible solutions. For example, the steam flow may be regulated by alteration of the net cross-section of the tubular projection 3 below the hole 5 by means (for example, transmission units) mounted exclusively on the body 2. This enables a normal kitchen lid, naturally of a size suitable for the body 2, to be used as the lid D, the body 2 being configured solely as an accessory, enabling the solution according to the invention to be implemented in association with any pan C having a respective lid D.

The food F to be cooked is introduced into the body 2 which, as can be seen in the drawings, is used with its open top facing upwards; the food may be constituted either by vegetables, such as greens, or by meat, such as poultry, beef, etc.

After the food F has been placed in the body 2 and the body 2 has been fitted in the pan C (naturally it may also be put in the pan C before the food F is placed inside it), the body 2 is closed at the top by a lid D.

At this point, the unit comprising the pan C (filled with water W), the body 2 (with the food F inside it), and the lid D, is placed over a heat source (preferably over a layer of charcoal but, in most current applications, on a normal gas or electric stove or possibly in an oven). As a result of the heating, the water W in the pan C comes to the boil and starts to produce steam. The steam rises inside the tubular projection 3 and then passes through the hole 5 at its top and diffuses inside the closed space in which the food F is disposed. As already stated, this operating condition usually continues for quite a long time (typically two hours) until the cooking process is complete.

Upon completion of the cooking, the lid D is removed and the body 2 can be lifted from the pan C with the use of the handles 8 for this purpose.

The same handles 8 can be used, for example, to carry the body 2 to the table, as a carrying container.

Tests and analysis carried out by the Applicant show, amongst other things, that the methods described allow cooking water with very critical characteristics, for example, with very high degrees of hardness, to be used without this having an adverse effect on the food thus cooked.

In particular, the fact that the flow of steam into the cooking chamber defined by the body 2 and the lid D can be regulated selectively is beneficial since it allows the degree of humidity to be regulated precisely during and, particularly, upon completion of the cooking process, thus preventing, for example, the production of food which is too dry or too moist, in dependence on its own water content.

Naturally, the principle of the invention remaining the same, the details of construction and forms of embodiment may be varied widely with respect to those described and illustrated, without thereby departing from the scope of the present invention.

In this connection, it is quite clear that the device according to the invention can be produced and marketed in accordance with various different solutions, that is, for example:

- as a unit formed by the body 2, the pan C and the lid D with the associated handle 10,
- as a unit formed by the body 2 and by the lid D with the associated handle 10, for use in association with a pan (or another steam source such as a kettle) already available to the user,
- as the body 2 alone with associated means for controlling the supply of steam (for example, a unit substantially comparable to the handle 10 which is or can be associated with the body 2) for use in association with a steam source and a lid already available to the user.

What is claimed is:

1. A steam cooking device comprising:
   a pot-like body defining a space for containing food to be cooked, said pot-like body including at least one duct means for the passage of steam from a steam source into said space for containing food, said pot-like body being fitted in use in said steam source, and
   control means for selectively controlling passage of said steam through said at least one duct means during the cooking process, said control means comprising obturator means which can selectively choke said at least one duct means by penetrating said at least one duct means selectively.

2. A device according to claim 1, wherein said pot-like body has a base and wherein said duct means comprises a chimney-like projection extending from and having a lower aperture in said base and having at least one upper aperture for the passage of steam into said space for cooking food.

3. A device according to claim 1, wherein said pot-like body is made of thermally conductive material.

4. A device according to claim 3, wherein said thermally conductive material is a metal such as steel.

5. A device according to claim 2, wherein said chimney-like projection is situated in a substantially central position relative to said pot-like body.

6. A device according to claim 1, wherein said steam source comprises a pan and said pot-like body has an outer or curved surface which is tapered to fit in the top of said pan in a leaktight manner.

7. A device according to claim 6, wherein said pot-like body has an open top of substantially identical dimensions with the top of said pan, and further comprising a lid belonging to said pan for closing said open top.

8. A device according to claim 1, wherein said obturator is tapered with a taper converging towards said at least one duct means.

9. A device according to claim 1, further comprising a lid for said pot-like body and, wherein said control means includes a duct extending therethrough to put said steam source into limited communication with the outside environment when said lid is fitted so as to close said space containing the food.

10. A steam cooking device, comprising:
    a pot-like body defining a space for containing food to be cooked, said pot-like body including at least one duct means for the passage of steam from a steam source into said space for containing food, said pot-like body being fitted in use in said steam source, and
    control means for selectively controlling passage of said steam through said at least one duct means during the cooking process,
    wherein said pot-like body has associated gripping means for the lifting of said pot-like body from said steam source, said gripping means having thermo-insulating characteristics and a generally perforate structure.

11. A steam cooking device comprising:
    a pot-like body defining a space for containing food to be cooked, said pot-like body including at least one duct means for the passage of steam from a steam source into said space for containing food, said pot-like body being fitted in use in said steam source, and
    control means for selectively controlling passage of said steam through said at least one duct means during the cooking process, wherein:
       said pot-like body has a base and said duct means comprises a chimney-like projection extending from and having a lower aperture in said base and having at least one upper aperture for the passage of steam into said space for cooking food,
       said upper aperture is constituted by a hole in the end of said chimney-like projection, and
       said control means comprises an obturator which can penetrate said hole selectively and has associated actuating means which enable it to move axially relative to said hole in said chimney-like projection.

12. A device according to claim 11, wherein said actuating means comprise screw actuating means.

13. A device according to claim 11, further comprising a lid for said pot-like body, said lid having a movable gripping element, the movement of which operates said actuating means.

14. A device according to claim 13, wherein:
    said movable actuating means comprises a rod which carries said gripping element and rotates as a result of the rotation of said gripping element,
    said rod is operatively coupled to the lid to create, on rotation of said rod, translational movement thereof towards and away from said hole in the end of said chimney-like projection, and
    said obturator is mounted on said on said rod in a position facing said hole.

15. A device according to claim 14, wherein said rod is operatively connected to said lid by male- and female-threaded coupling means.

16. A steam cooking device comprising:

a pot-like body and a lid, said body and said lid together defining a space for containing food to be cooked, said pot-like body including at least one duct means for the passage of steam from a steam source into said space for containing food, said pot-like body being fitted in use in said steam source, and control means for selectively controlling passage of said steam through said at least one duct means during the cooking process, wherein:

said pot-like body has a base and said duct means comprises a chimney-like projection extending from and having a lower aperture in said base and having at least one upper aperture for the passage of steam into said space for cooking food, said control means comprise a movable element having at least one hole which can be aligned to a variable extent with said at least one duct means for the passage of steam, the extent of the alignment of said at least one hole and said at least one duct means determining the amount of steam passing into said space containing food, and said lid has a movable gripping element, the movement of which brings about the movement of the movable element.

17. A device according to claim 16, wherein said at least one hole is constituted by a lateral hole in said chimney-like projection, and said movable element is constituted by a cup-like element fitted onto said chimney-like projection.

18. A device according to claim 17, wherein said cup-like element can rotate relative to said chimney-like projection.

19. A device according to claim 16, wherein:

said movable gripping element is carried by a rod which is rotatably mounted in said lid, whereby rotation of the gripping element causes rotation of said movable element, and said movable element is mounted on said rod in a position facing said chimney-like projection.

* * * * *